P. & W. C. ALLISON.
CAR AXLE.

No. 2,322.  PATENTED NOV. 3, 1841.

UNITED STATES PATENT OFFICE.

PETER ALLISON AND WM. C. ALLISON, OF PHILADELPHIA, PENNSYLVANIA.

MANNER OF STRENGTHENING THE AXLES OF RAILROAD-CARS BY MEANS OF SAFETY-BOXES.

Specification of Letters Patent No. 2,322, dated November 3, 1841.

*To all whom it may concern:*

Be it known that we, PETER ALLISON and WILLIAM C. ALLISON, of the city and county of Philadelphia and State of Pennsylvania, have invented a new and useful Revolving Safety-Box for Car-Axles, called "Allison's Revolving Safety-Box," which is described as follows, reference being had to the annexed drawings of the same, making part of this specification.

Figure 2:
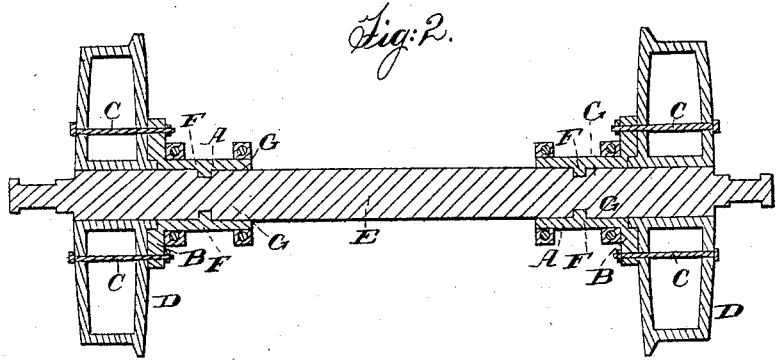
Figure 1:
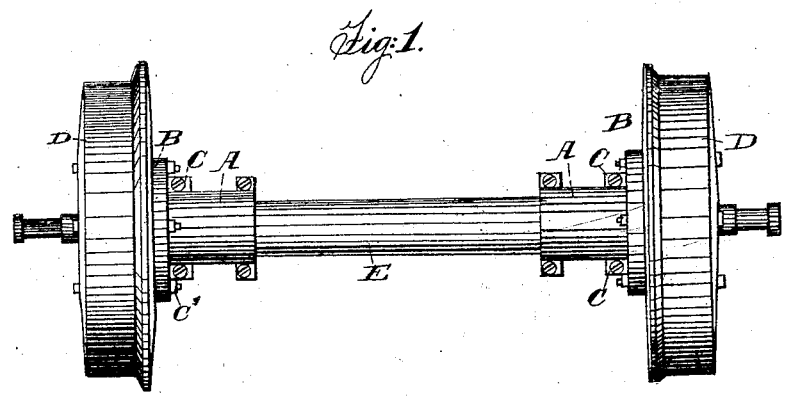

Figure 1 is a top view of a pair of car wheels with the safety boxes attached thereto. Fig. 2 is a horizontal section of ditto.

Similar letters refer to corresponding parts in the figures.

The object of this invention is to prevent the axle from breaking while turning short curves, or from any other cause or from being twisted in any way; or from becoming loose; and also when the axle breaks from an imperfection in the iron, or other cause, to support or hold up the broken parts and retain them in the same horizontal line which they occupied previous to the axle breaking and rendering the axle almost as strong as when in one piece, and likewise to hold together or splice the two ends of a broken axle of the common kind. This we effect by placing around the axle E inside of each wheel (where it usually breaks) a box A made in two parts, each part being a semicircular concave box with flanges or ears through which screws are passed securing the parts together over the axle.

On the outside end of each box next the wheel and at right angles thereto is formed a circular head B about twice the diameter of the divided box, more or less, in which head near the circumference and at equal distances apart are made four or more apertures to admit screw bolts, or hooks C, which pass through the plates of the car wheel D and through the aforesaid apertures having nuts screwed on them against the inside of said head which thus secure the safety box to the car wheel.

On the inside of each safety box is formed a tongue F which fits into a corresponding groove G made in the circumference of the car axle.

The above described divided box being placed around the axle next the wheel, where the axle usually breaks, and where it is most strained, and being fastened to the car wheel, strengthens that part of the axle and renders it secure, and when it breaks from a flaw in the iron, or from any other cause, inside the divided or safety box it supports the two parts in a horizontal line and renders the axle almost as effective and useful as before it was broken—the parts having a uniform motion and being prevented from driving upward into the car and injuring the passengers—and the tongue and groove preventing the wheel from leaving the track by moving laterally.

When spoke wheels are used the aforesaid safety boxes are secured to them by screw rods which are bent around the spokes in the manner of a hook—the straight parts being passed through the aforesaid apertures in the head of the divided box—and having nuts screwed on their ends which hold them firmly in their proper places.

We do not claim as our invention simply strengthening the axles by means of screw bolts passing through the wheels and attached to flanches projecting from a tube attached to the middle of the axle as this has been previously done; but

What we claim as our invention and which we desire to secure by Letters Patent is—

The construction and arrangement of the safety boxes on the axles of the car wheels having tongues inside said boxes fitting into corresponding grooves in the peripheries of the axles in the manner and for the purposes herein set forth and rods or hooks with screw nuts for securing the safety boxes to the car wheels as above described or whether constructed in any other manner substantially the same and for a similar purpose.

PETER ALLISON.
WILLIAM C. ALLISON.

Witnesses:
WM. THOMPSON,
H. C. THOMPSON.